(12) United States Patent
Chou (10) Patent No.: US 9,975,600 B2
(45) Date of Patent: May 22, 2018

(54) PEDAL-PROPELLED TRANSMISSION MECHANISM

(71) Applicant: Shui-Chuan Chou, Taipei (TW)

(72) Inventor: Shui-Chuan Chou, Taipei (TW)

(*) Notice: Subject to any disclaimer, the term of this patent is extended or adjusted under 35 U.S.C. 154(b) by 8 days.

(21) Appl. No.: 15/237,641

(22) Filed: Aug. 16, 2016

(65) Prior Publication Data

US 2017/0073037 A1    Mar. 16, 2017

(30) Foreign Application Priority Data

Sep. 2, 2015  (TW) .............................. 104214217 U (51) Int. Cl.
| | |
|---|---|
| *B62M 1/26* | (2013.01) |
| *B62K 3/00* | (2006.01) |
| *B62K 3/10* | (2006.01) |
| *B62K 21/02* | (2006.01) |
| *B62K 21/12* | (2006.01) |
| *B62M 1/28* | (2013.01) |
| *B62M 9/02* | (2006.01) |

(52) U.S. Cl.
CPC .............. *B62M 1/26* (2013.01); *B62K 3/002* (2013.01); *B62K 3/10* (2013.01); *B62K 21/02* (2013.01); *B62K 21/12* (2013.01); *B62M 1/28* (2013.01); *B62M 9/02* (2013.01); *B62M 2700/003* (2013.01); *B62M 2700/006* (2013.01)

(58) Field of Classification Search
CPC .... B62M 1/26; B62M 1/28; B62M 2700/006; B62K 3/002
See application file for complete search history.

(56) References Cited

U.S. PATENT DOCUMENTS

| | | | | |
|---|---|---|---|---|
| 2,466,105 | A * | 4/1949 | Hoffman | B62K 3/002 280/221 |
| 4,846,488 | A * | 7/1989 | Szadkowski | B62M 1/28 280/214 |
| 5,224,724 | A * | 7/1993 | Greenwood | B62M 1/26 280/221 |
| 6,659,486 | B2 * | 12/2003 | Eschenbach | B62K 3/002 280/221 |
| 6,715,779 | B2 * | 4/2004 | Eschenbach | B62K 3/002 280/221 |
| 6,764,088 | B2 * | 7/2004 | Hung | B62K 3/002 280/221 |
| 6,769,706 | B2 * | 8/2004 | Chow | B62K 3/002 280/253 |
| 7,717,446 | B2 * | 5/2010 | Pate | B62M 1/26 280/220 |
| 7,784,808 | B2 * | 8/2010 | Fan | B62M 1/26 280/221 |

(Continued)

*Primary Examiner* — Joseph M Rocca
*Assistant Examiner* — Michael R Stabley (57) ABSTRACT

A pedal-propelled transmission mechanism, applied in a workout equipment; the workout equipment including a deck, a front tube fixed at a front end of the deck, and a handle fixed on a top end of the front tube; the pedal-propelled transmission mechanism comprising a driving chainring having a center axle pivotally connected to a proximity of a rear section of the deck, a left pedal mechanism, and a right pedal mechanism, whereby the structure of the pedal-propelled transmission mechanism is simple that reduces the production cost and time, and easily repair and change when the parts are broken.

13 Claims, 7 Drawing Sheets

(56) References Cited

U.S. PATENT DOCUMENTS

| | | | | |
|---|---|---|---|---|
| 8,056,915 B2* | 11/2011 | Pang | ............... | B62M 1/26 |
| | | | | 280/210 |
| 8,162,337 B2* | 4/2012 | Teal | ............... | B62K 3/002 |
| | | | | 280/221 |
| 8,899,605 B2* | 12/2014 | Kim | ............... | B62K 3/002 |
| | | | | 280/221 |
| 9,475,543 B1* | 10/2016 | Chou | ............... | B62M 1/26 |
| 2004/0018919 A1* | 1/2004 | Chen | ............... | A63B 22/0056 |
| | | | | 482/57 |
| 2013/0161924 A1* | 6/2013 | Kim | ............... | B62K 3/002 |
| | | | | 280/257 |

\* cited by examiner

PEDAL-PROPELLED TRANSMISSION MECHANISM

CROSS-REFERENCE TO RELATED APPLICATION

This application claims priority from Taiwan Patent Application No. 104214217, filed Sep. 2, 2015, the contents of which are hereby incorporated by reference in their entirety for all purposes.

FIELD OF THE INVENTION

The present invention relates to a sport equipment, particularly to a pedal-propelled transmission mechanism applied, in the sport equipment.

BACKGROUND OF THE INVENTION

The structure of the human-powered sport equipment at the present recreational activities is a hit complicated, and difficulty in assembly and maintenance, which causes not only an increase in manufacturing cost, but also causes a difficulty in repairing the broken parts.

As such, the present invention is to provide a pedal-propelled transmission mechanism that is a simple structure, an easy to assemble, repair, step, and maintain the kinetic energy.

SUMMARY OF INVENTION

A pedal-propelled transmission mechanism, applied in a workout equipment; the workout equipment including a deck, a front tube fixed at a front end of the deck, and a handle fixed on a top end of the front tube; the pedal-propelled transmission mechanism comprising: a driving chainring having a center axle pivotally connected to a proximity of a middle section or a rear section of the deck; a left pedal mechanism including a left front driving rod, a left rear driving rod, a left center driving rod, and a left pedal; the left front driving rod having one end thereof pivotally connected to one end of the left center driving rod, and the other end connected to a front section of the deck; the left rear driving rod having one end thereof pivotally connected to the other end of the left center driving rod, and the other end connected to the center axle; and a right pedal mechanism including a right front driving rod, a right rear driving rod, a right center driving rod, and a right pedal; the right front driving rod having one end thereof pivotally connected to one end of the right center driving rod, and the other end connected to the front section of the deck; the right rear driving rod having one end thereof pivotally connected to the other end of the right center driving rod, and the other end connected to the center axle.

Wherein the left pedal comprises a left axle disposed at a middle section thereof and pivotally connected to the left center driving rod; the right pedal having a right axle disposed at a middle section thereof and pivotally connected to the right center driving rod.

Wherein the deck comprises a front supporting post disposed on the front section thereof; wherein the other end of the left front driving rod is pivotally connected to the front supporting post, and the other end of the right front driving rod is also pivotally connected to the front supporting post.

Wherein the front supporting post is formed by extending toward a top of the deck.

wherein the front supporting post is formed by extending toward a bottom of the deck.

wherein the deck farther comprises a front axle penetrated through the front section thereof, the front axle having both ends respectively fixed on the other end of the left front driving rod and the right front driving rod; wherein one end of the left front driving rod and one end of the right front driving rod are extended in opposite directions.

wherein the total length of the left front driving rod, the left center driving rod, and the left rear driving rod of the left pedal mechanism is different from that of the right front driving rod, the right center driving rod, and the right rear driving rod of the right pedal mechanism.

wherein the deck comprises a rear fork disposed at a rear end thereof, a rear wheel pivotally disposed on a bottom end of the rear fork, a driven chainring disposed at a center of the rear wheel; wherein the driving chainring is connected with the driven chainring via a driving element; the center axle drives the driving chainring, and the driving chainring can rotate the driven chainring and the rear wheel.

Wherein the front tube of the workout equipment comprises a front fork having a front wheel pivotally disposed at a bottom end thereof, and the handle disposed on a top end thereof, so that the handle can control the direction of the front wheel via the front fork.

A pedal-propelled transmission mechanism, applied in a workout equipment; the workout equipment including a deck, a front tube fixed at a front end of the deck, and a handle fixed on a top end of the front tube; the pedal-propelled transmission mechanism comprising: a driving chainring including a center axle pivotally connected to a proximity of a middle section or a rear section of the deck; a left pedal mechanism including a left guide rail bracket, a left rear driving rod, a left center driving rod, and a left pedal; the left guide rail bracket being disposed on a front end of the deck and having a guide rail groove disposed at a top end thereof; the left center driving rod having one end thereof disposed within the guide rail groove and being capable of freely sliding therein, and the other end pivotally connected to one end of the left rear driving rod, the left rear driving rod having the other end thereof installed on the center axle; and a right pedal mechanism including a right guide rail bracket, a right rear driving rod, a right center driving rod, and a right pedal; the right guide rail bracket being disposed on the front end of the deck and having a guide rail groove disposed at a top end thereof; the right center driving rod having one end thereof disposed within the guide rail groove and being capable of freely sliding therein, and the other end pivotally connected to one end of the right rear driving rod, the right rear driving rod having the other end thereof installed on the center axle.

Wherein the left pedal comprises a left axle disposed at a middle section thereof and pivotally connected to the left center driving rod; the right pedal including a right axle disposed at a middle section thereof and pivotally connected to the right center driving rod.

Wherein the left guide rail bracket is formed by extending toward a top of the deck.

Wherein the left guide rail bracket is formed by extending toward a bottom of the deck.

Wherein the total length of the left rear driving rod and the left center driving rod of the left pedal mechanism is different from that of the right rear driving rod and the right center driving rod of the right pedal mechanism.

Wherein the deck comprises a rear fork disposed at a rear end thereof, a rear wheel pivotally disposed on a bottom end of the rear fork, a driven chainring disposed at a center of the rear wheel; wherein the driving chainring is connected with the driven chainring via a driving element; the center axle drives the driving chainring, and the driving chainring rotates the driven chainring and the rear wheel.

Wherein the front tube of the workout equipment comprises a front fork having a front wheel pivotally disposed at a bottom end thereof and the handle disposed on a top end thereof, so that the handle can control the direction of the front wheel via the front fork, whereby the pedal-propelled transmission mechanism can continuously rotate with an inertia and maintain kinetic energy thereof. Besides, the structure of the pedal-propelled transmission mechanism is simple that reduces the production cost and time, and easily repair and change when the parts are broken.

DETAILED DESCRIPTION OF THE PREFERRED EMBODIMENTS

Embodiment 1

Figure 1:
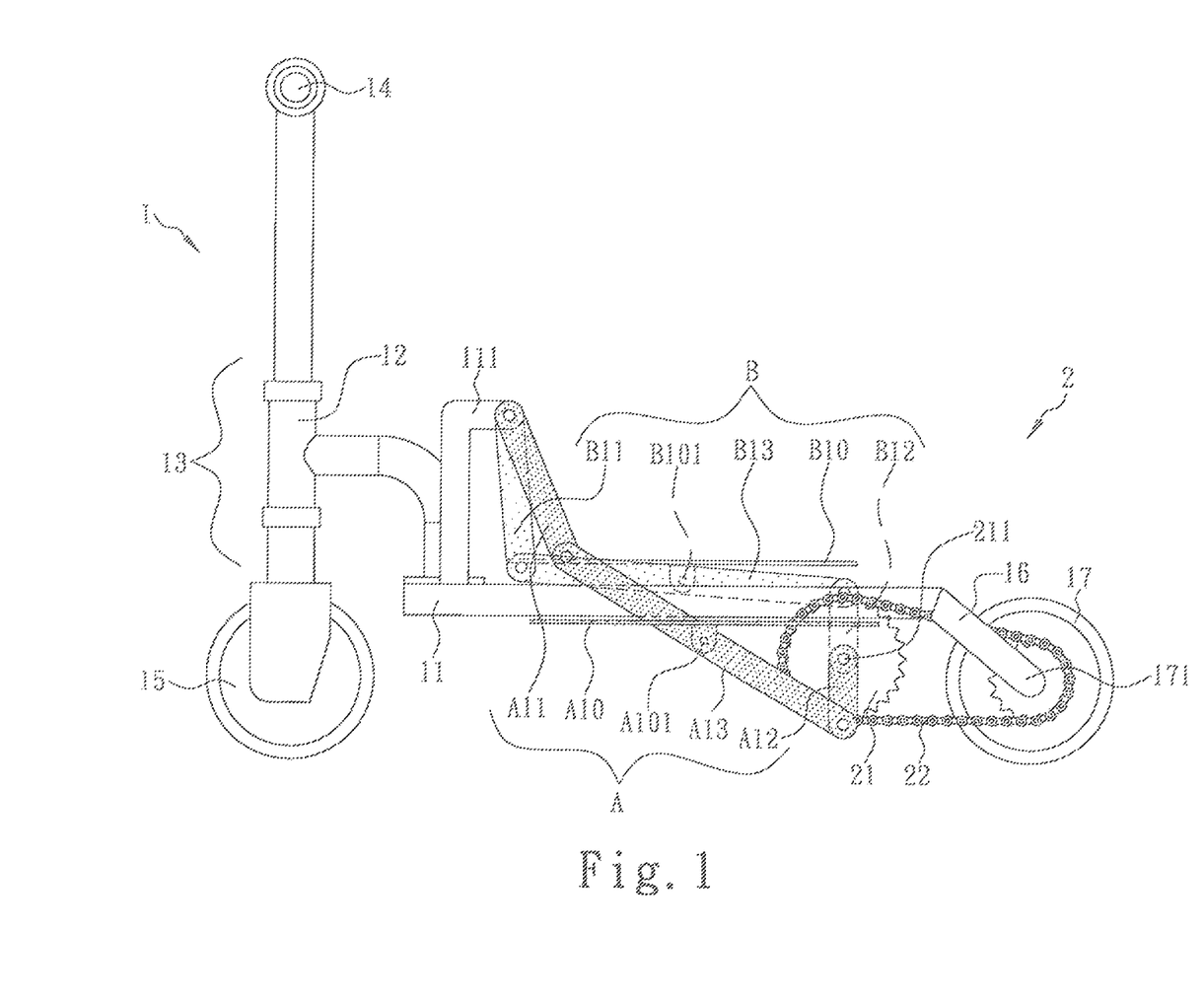
FIG. 1 is a schematic view of a workout equipment a first embodiment.
Figure 2:
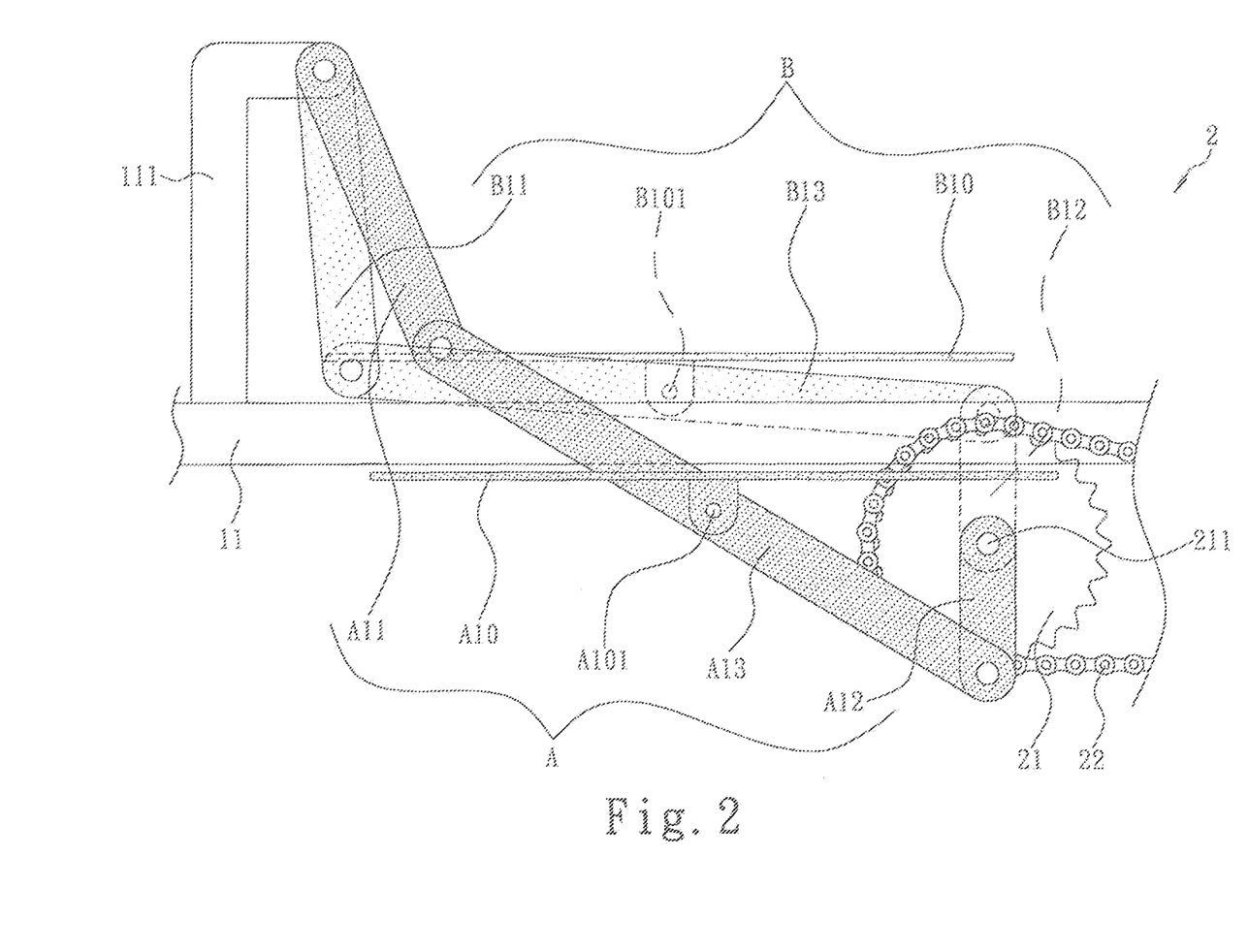
FIG. 2 is a schematic view showing a transmission mechanism of FIG. 1.

Referring to FIGS. 1-2, a pedal-propelled transmission mechanism (2) is applied in a workout equipment, such as a pedal scooter (1), which includes a deck (11), a front tube (12) fixed at a front end of the deck (11), a front fork (13) pivotally installed on the front tube (12), a handle (14) fixed on the front fork (13), and a front wheel (15) disposed at a bottom end of the front fork (13), so that the handle (14) can control the direction of the front wheel (15) via the front fork (13). The deck (11) further comprises a rear fork (16) disposed at a rear end thereof, a rear wheel (17) pivotally disposed on a bottom end of the rear fork (16), a driven chainring (171) disposed at a center of the rear wheel (17). However, when the pedal-propelled transmission mechanism (2) is applied in a stepping machine (not disclosed) or other workout equipment (not disclosed), the front tube (12) and the front fork (13) can be integrated into one structure, and the rear wheel (17) can be changed into a damper or other stricture.

The pedal-propelled transmission mechanism (2) comprises a driving chainring (21) having a center axle (211) pivotally connected to a proximity of a rear section of the deck (11), a left pedal mechanism (A), and a right pedal mechanism (B). Wherein the driving chainring (21) is connected with the driven chainring (171) via a driving element (22); the center axle (211) drives the driving chainring (21), and the driving chainring (21) can rotate the driven chainring (171) and the rear wheel. However, the center axle (211) can also be pivotally connected to a middle section of the deck (11) (not disclosed), and the pedal-propelled transmission mechanism (2) can operate without installing the rear fork (16), the driven chainring (21), the rear wheel (17), and the driving element (22).

The left pedal mechanism (A) and the right pedal mechanism (B) are respectively installed in a left side of a right side of the deck (11), the left pedal mechanism (A) including a left front driving rod (A11), a left rear driving rod (A12), a left center driving rod (A13), and a left pedal (A10); the left front driving rod (A11) having one end thereof pivotally connected to one end of the left center driving rod (A13), and the other end connected to a front section of the deck (11); the left rear driving rod (A12) having one end thereof pivotally connected to the other end of the left center driving rod (A13), and the other end connected to the center axle (211); and the right pedal mechanism (B) including a right front driving rod (B11), a right rear driving rod (B12), a right center driving rod (B13), and a right pedal (B10); the right front driving rod (B11) having one end thereof pivotally connected to one end of the right center driving rod (B13), and the other end connected to the front section of the deck (11); the right rear driving rod (B12) having one end thereof pivotally connected to the other end of the right center driving rod (B13) and the other end connected to the center axle (211).

wherein the left pedal (A10) comprises a left axle (A101) disposed at a middle section thereof and pivotally connected to the left center driving rod (A13); the right pedal (B10) having a right axle (B101) disposed at a middle section thereof and pivotally connected to the right center driving rod (B13). Wherein the deck (11) comprises a front supporting post (111) disposed on the front section thereof; wherein the other end of the left front driving rod (A11) is pivotally connected to the front supporting post (111), and the other end of the right front driving rod (B11) is also pivotally connected to the front supporting post (111). Accordingly, when a rider alternately steps on the left pedal (A10) and the right pedal (B10), the left pedal (A10) and the right pedal (B10) will be tilted relative to the stepping angle, whereby the rider can more easily apply force with his/her feet on the tilted pedals and drive repeatedly the left center driving rod (A13) and the right center driving rod (B13), the left front driving rod (A11) and the right front driving rod (B11), and the left rear driving rod (A12) and the right rear driving rod (B12) on the center axle (211) with a torque force, such that the pedal-propelled transmission mechanism (2) can continuously rotate with an inertia and maintain kinetic energy thereof. Besides, the structure of the pedal-propelled transmission mechanism (2) is simple that reduces the production cost and time, and easily fix and change when the parts are broken.

Figure 3A:
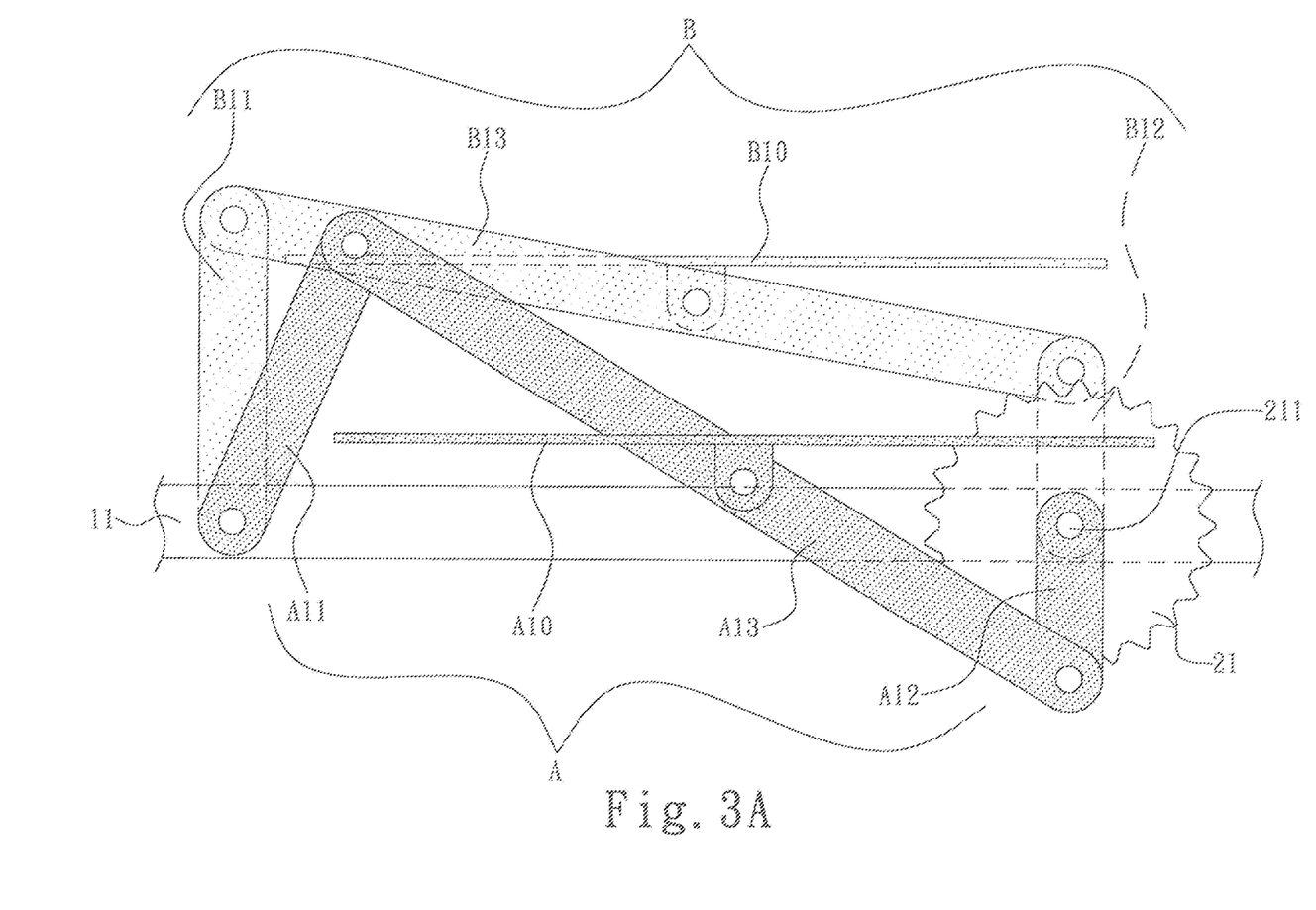
FIG. 3A is a schematic view of another transmission mechanism.
Figure 3B:
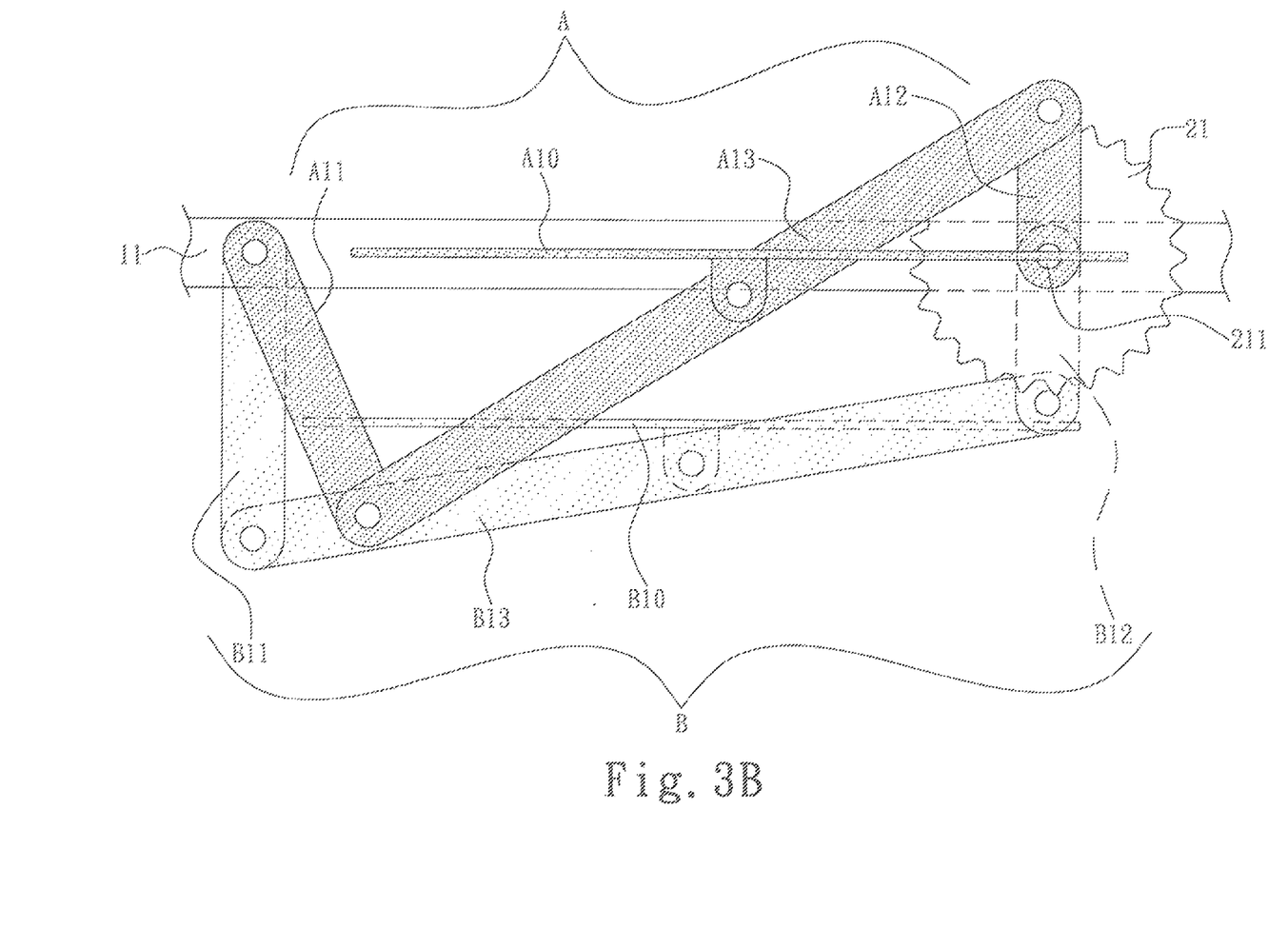
FIG. 3B is another schematic view showing the transmission mechanism of FIG. 3A.

Referring to FIG. 2, the front supporting post (111) is formed by extending toward a top of the deck (11). Besides, the front supporting post (111) is also formed by extending toward a bottom of the deck (11). Or, the other end of the left front driving rod (A11) and the right front driving rod (B11) can be directly installed on the deck (11) without the front supporting post (111) as shown in FIGS. 3A and 3B, the structure of deck (11) can be changeable in accordance with different workout types. Simultaneously, the left pedal (A10) and the right pedal (B10) can be adjusted in height from the ground for improving rider's safety.

wherein the total length of the left front driving rod (A11), the left center driving rod (A13), and the left rear driving rod (A12) of the left pedal mechanism (A) is different from or the same as that of the right front driving rod (B11), the right center driving rod (B13), and the right rear driving rod (B12) of the right pedal mechanism (B). Or, the left pedal (A10)

correspondingly installed on the left center driving rod (A13) is different from or the same as the right pedal (B10) correspondingly installed on the right center driving rod (B13), whereby the rider can respectively apply different torque force on the center axle (211) during the riding process.

Embodiment 2

Figure 4:
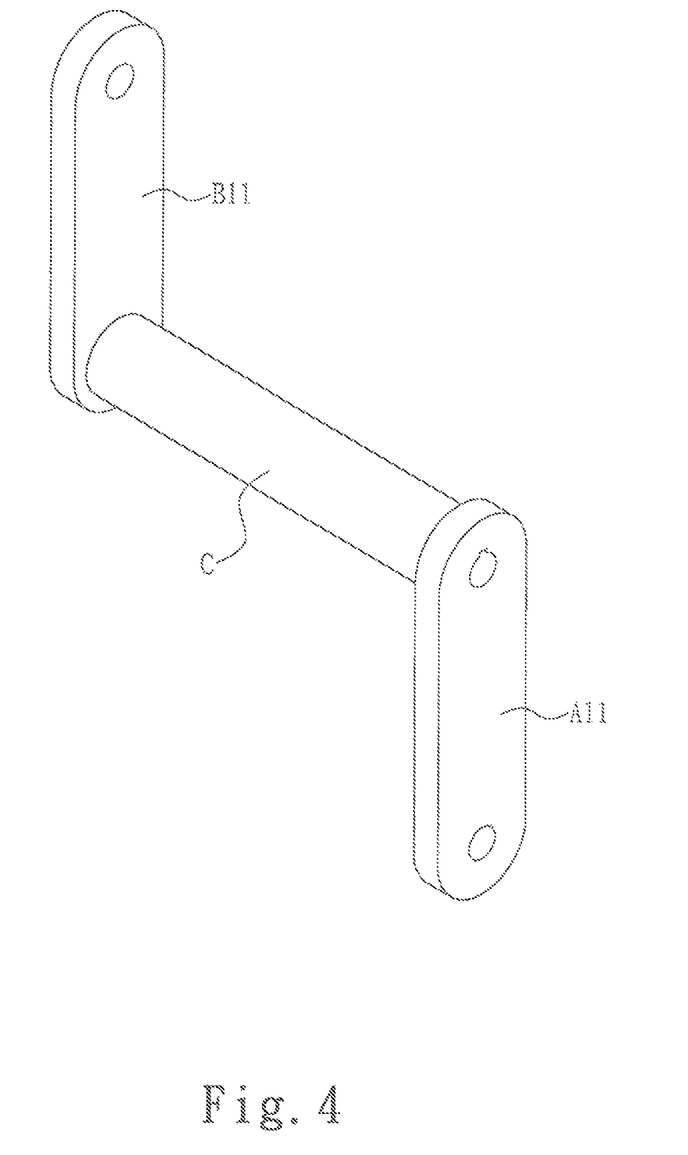
FIG. 4 is a schematic view of the other transmission mechanism.
Figure 5:
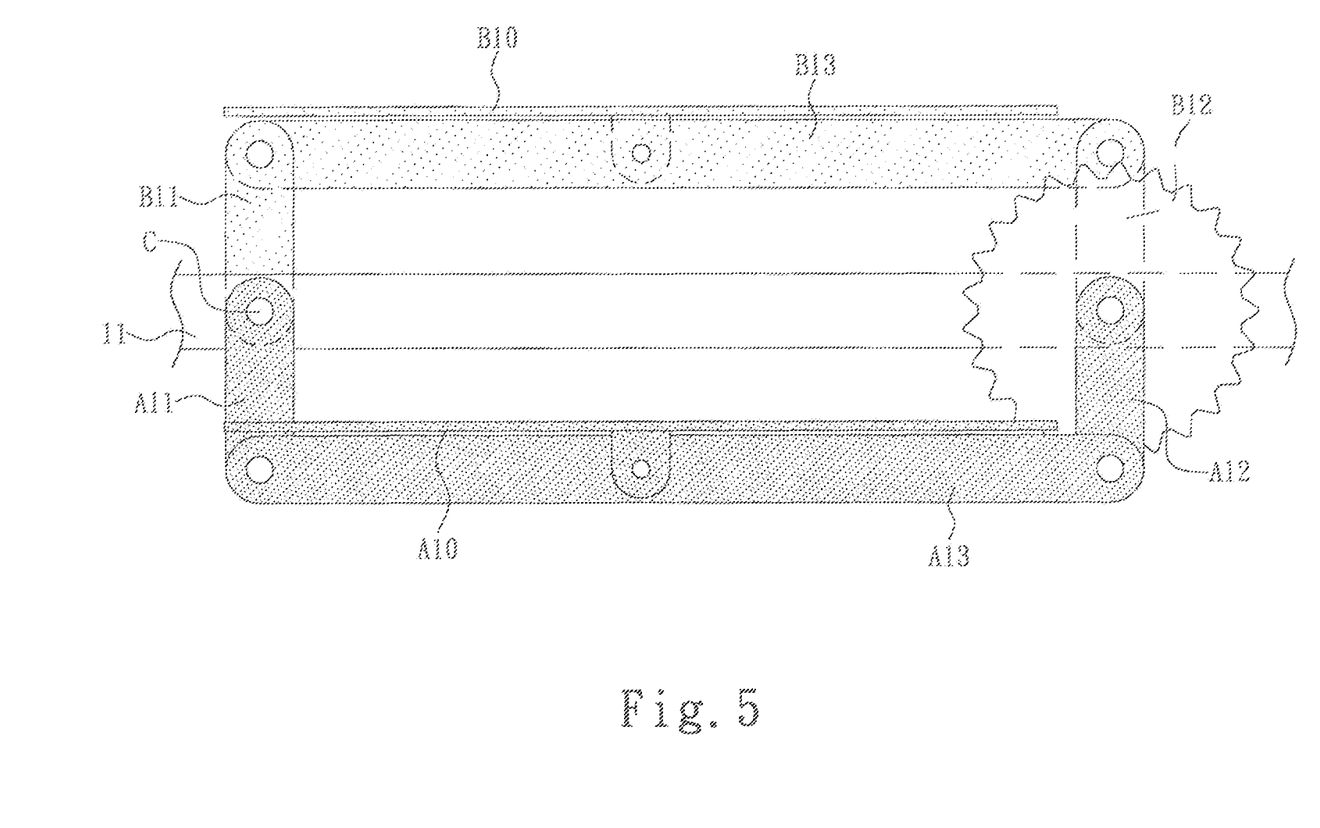
FIG. 5 is a second embodiment of the transmission mechanism.

Referring to FIGS. 4 and 5, the left front driving rod (A11) and the right front driving rod (B11) are respectively installed on the left side and right side of the deck (11), wherein the deck (11) further comprises a front axle (C) penetrated through the front section thereof, the front axle (C) having both ends respectively fixed on the other end of the left front driving rod (A11) and the right front driving rod (B11); wherein one end of the left front driving rod (A11) and one end of the right front driving rod (B11) are extended in opposite direction. Therefore, when the left pedal (A10) moves down below the deck (11), one end of the left center driving rod (A13) and the left rear driving rod (A12) will be driven below the deck (11), simultaneously, one end of the right front driving rod will drive one end of the right center driving rod (B13) and the right rear driving rod (B12) to move up above the deck (11), so that the right pedal is located above the deck (11). Accordingly, the rider can apply force with his/her feet alternately on the left pedal (A10) and the right pedal (B10).

Embodiment 3

Figure 6:
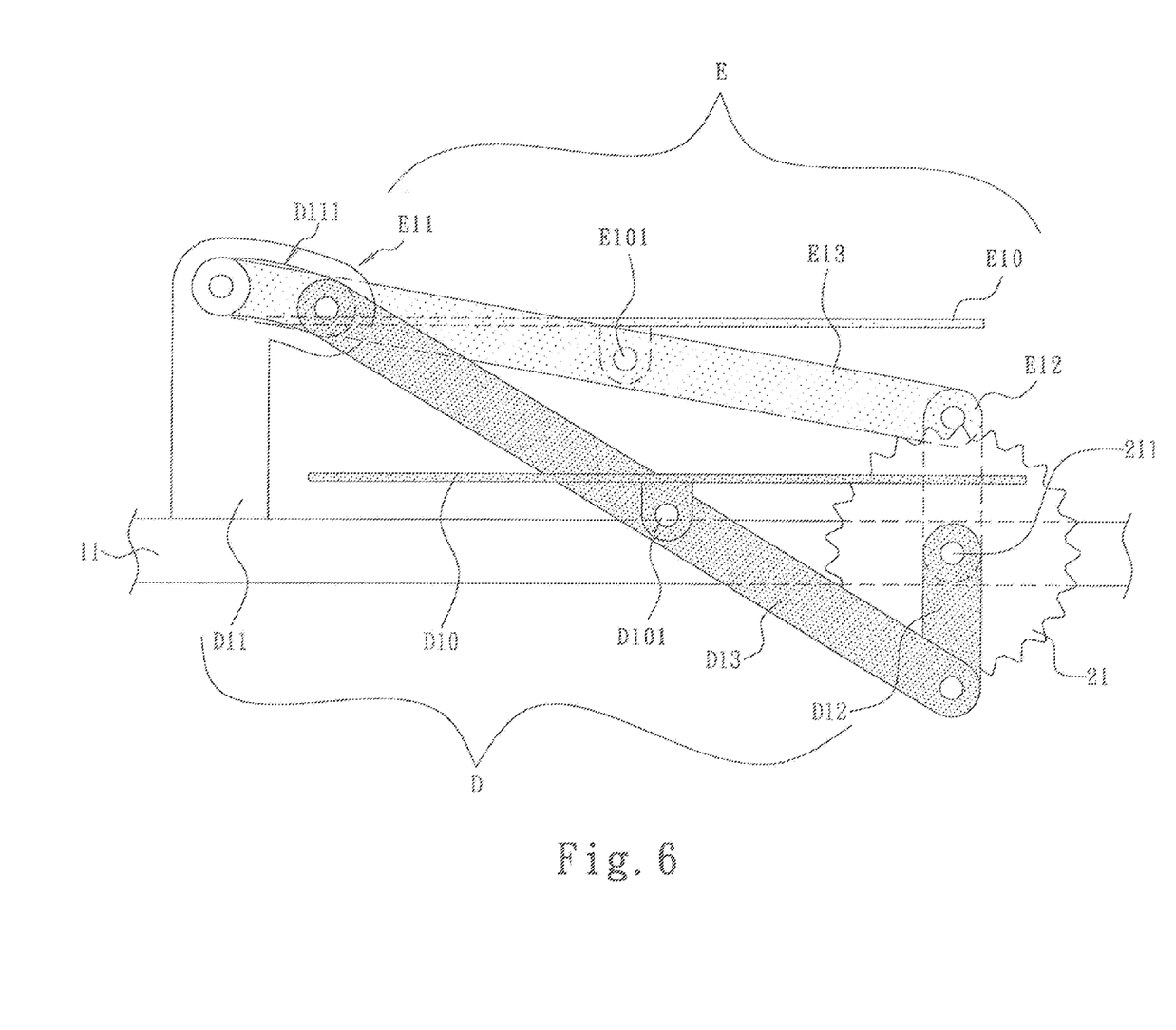
FIG. 6 is a third embodiment of the transmission mechanism.

Referring to FIG. 6, the pedal-propelled transmission mechanism (2) comprises a driving chainring (21) including a center axle (211) pivotally connected to a proximity of a middle section or a rear section of the deck (11); a left pedal mechanism (D) including a left guide rail bracket (D11), a left rear driving rod (D12), a left center driving rod (D13), and a left pedal (D10); the left guide rail bracket (D11) being disposed on a front end of the deck (11) and having a guide rail groove (D111) disposed at a top end thereof; the left center driving rod (D13) having one end thereof disposed within the guide rail groove (D111) and being capable of freely sliding therein, and the other end pivotally connected to one end of the left rear driving rod (D12), the left rear driving rod (D12) having the other end thereof installed on the center axle (211); and a right pedal mechanism including a right guide rail bracket, a right rear driving rod, a right center driving rod and a right pedal; the right guide rail bracket being disposed on the front end of the deck and having a guide rail groove disposed at a top end thereof; the right center driving rod having one end thereof disposed within the guide rail groove and being capable of freely sliding therein, and the other end pivotally connected to one end of the right rear driving rod, the right rear driving rod having the other end thereof installed on the center axle. Wherein the left pedal (D10) comprises a left axle (A101) disposed at a middle section thereof and pivotally connected to the left center driving rod (D13); the right pedal including a right axle disposed at a middle section thereof and pivotally connected to the right center driving rod.

Wherein the left guide rail bracket (D11) is formed by extending toward a top of the deck (11). Besides, wherein the left guide rail bracket (D11) is formed by extending toward a bottom of the deck (11).

Besides, the structure of the left pedal mechanism (D) is the same as that of the right pedal mechanism, the only difference is that the right pedal mechanism is installed on right side of the deck (11), so the structure of right pedal mechanism does not describe in detail here.

Wherein the total length of the left rear driving rod (D12) and the left center driving rod (D13) of the left pedal mechanism (D) is different from that of the right rear driving rod and the right center driving rod of the right pedal mechanism (B).

wherein the deck (11) comprises a rear fork (16) disposed at a rear end thereof, a rear wheel (17) pivotally disposed on a bottom end of the rear fork (16), a driven chainring (171) disposed at a center of the rear wheel (17); wherein the driving chainring (21) is connected with the driven chainring (171) via a driving element (22); the center axle (211) drives the driving chainring (21), and the driving chainring (21) rotates the driven chainring (171) and the rear wheel.

Wherein the front tube (12) of the workout equipment comprises a front fork (13) having a front wheel (15) pivotally disposed at a bottom end thereof and the handle (14) disposed on a top end thereof, so that the handle (14) can control the direction of the front wheel (15) via the front fork (13).

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A pedal-propelled transmission mechanism (2), applied in a workout equipment; the workout equipment including a deck (11), a front tube (12) fixed at a front end of the deck (11), and a handle (14) fixed on a top end of the front tube (12);

the pedal-propelled transmission mechanism (2) comprising:
a driving chainring (21) having a center axle (211) pivotally connected to a proximity of a middle section or a rear section of the deck (11);
a left pedal mechanism (A) including a left front driving rod (A11), a left rear driving rod (A12), a left center driving rod (A13), and a left pedal (A10); the left front driving rod (A11) having one end thereof pivotally connected to one end of the left center driving rod (A13), and the other end connected to a front section of the deck (11); the left rear driving rod (A12) having one end thereof pivotally connected to the other end of the left center driving rod (A13), and the other end connected to the center axle (211); and
a right pedal mechanism (B) including a right front driving rod (B11), a right rear driving rod (B12), a right center driving rod (B13), and a right pedal (B10); the right front driving rod (B11) having one end thereof pivotally connected to one end of the right center driving rod (B13), and
the other end connected to the front section of the deck (11); the right rear driving rod (B12) having one end thereof pivotally connected to the other end of the right center driving rod (B13), and the other end connected to the center axle (211);
wherein the left pedal (A10) comprises a left axle (A101) disposed at a middle section thereof and pivotally connected to the left center driving rod (A13); the right pedal (B10) having a right axle (B101) disposed at a middle section thereof and pivotally connected to the right center driving rod (B13).

2. The pedal-propelled transmission mechanism according to claim 1, wherein the deck (11) comprises a front supporting post (111) disposed on the front section thereof; wherein the other end of the left front driving rod (A11) is pivotally connected to the front supporting post (111), and the other end of the right front driving rod (B11) is also pivotally connected to the front supporting post (111).

3. The pedal-propelled transmission mechanism according to claim 2, wherein the front supporting post (111) is formed by extending toward a top of the deck (11).

4. The pedal-propelled transmission mechanism according to claim 1, wherein the deck (11) further comprises a front axle (C) penetrated through the front section thereof, the front axle (C) having both ends respectively fixed on the other end of the left front driving rod (A11) and the right front driving rod (B11); wherein one end of the left front driving rod (A11) and one end of the right front driving rod (B11) are extended in opposite directions.

5. The pedal-propelled transmission mechanism according to claim 1, wherein the total length of the left front driving rod (A11), the left center driving rod (A13), and the left rear driving rod (A12) of the left pedal mechanism (A) is different from that of the right front driving rod (B11), the right center driving rod (B13), and the right rear driving rod (B12) of the right pedal mechanism (B).

6. The pedal-propelled transmission mechanism according to claim 1, wherein the deck (11) comprises a rear fork (16) disposed at a rear end thereof, a rear wheel (17) pivotally disposed on a bottom end of the rear fork (16), a driven chainring (171) disposed at a center of the rear wheel (17); wherein the driving chainring (21) is connected with the driven chainring (171) via a driving element (22); the center axle (211) drives the driving chainring (21), and the driving chainring (21) can rotate the driven chainring (171) and the rear wheel.

7. The pedal-propelled transmission mechanism according to claim 1, wherein the front tube (12) of the workout equipment comprises a front fork (13) having a front wheel (15) pivotally disposed at a bottom end thereof, and the handle (14) disposed on a top end thereof, so that the handle (14) can control the direction of the front wheel (15) via the front fork (13).

8. A pedal-propelled transmission mechanism (2), applied in a workout equipment; the workout equipment including a deck (11), a front tube (12) fixed at a front end of the deck (11), and a handle (14) fixed on a top end of the front tube; the pedal-propelled transmission mechanism (2) comprising:
a driving chainring (21) including a center axle (211) pivotally connected to a proximity of a middle section or a rear section of the deck (11);
a left pedal mechanism (D) including a left guide rail bracket (D11), a left rear driving rod (D12), a left center driving rod (D13), and a left pedal (D10); the left guide rail bracket (D11) being disposed on a front end of the deck (11) and having a guide rail groove (D111) disposed at a top end thereof; the left center driving rod (D13) having one end thereof disposed within the guide rail groove (D111) and being capable of freely sliding therein, and the other end pivotally connected to one end of the left rear driving rod (D12), the left rear driving rod (D12) having the other end thereof installed on the center axle (211); and
a right pedal mechanism including a right guide rail bracket, a right rear driving rod, a right center driving rod, and a right pedal; the right guide rail bracket being disposed on the front end of the deck and having a guide rail groove disposed at a top end thereof; the right center driving rod having one end thereof disposed within the guide rail groove and being capable of freely sliding therein, and the other end pivotally connected to one end of the right rear driving rod, the right rear driving rod having the other end thereof installed on the center axle.

9. The pedal-propelled transmission mechanism according to claim 8, wherein the left pedal (D10) comprises a left axle (A101) disposed at a middle section thereof and pivotally connected to the left center driving rod (D13); the right pedal including a right axle disposed at a middle section thereof and pivotally connected to the right center driving rod.

10. The pedal-propelled transmission mechanism according to claim 8, wherein the left guide rail bracket (D11) is formed by extending toward a top of the deck (11).

11. The pedal-propelled transmission mechanism according to claim 8, wherein the total length of the left rear driving rod (D12) and the left center driving rod (D13) of the left pedal mechanism (D) is different from that of the right rear driving rod and the right center driving rod of the right pedal mechanism (B).

12. The pedal-propelled transmission mechanism according to claim 8, wherein the deck (11) comprises a rear fork (16) disposed at a rear end thereof, a rear wheel (17) pivotally disposed on a bottom end of the rear fork (16), a driven chainring (171) disposed at a center of the rear wheel (17); wherein the driving chainring (21) is connected with the driven chainring (171) via a driving element (22); the center axle (211) drives the driving chainring (21), and the driving chainring (21) rotates the driven chainring (171) and the rear wheel.

13. The pedal-propelled transmission mechanism according to claim 8, wherein the front tube (12) of the workout equipment comprises a front fork (13) having a front wheel (15) pivotally disposed at a bottom end thereof and the handle (14) disposed on a top end thereof, so that the handle (14) can control the direction of the front wheel (15) via the front fork (13).

* * * * *